(12) United States Patent
Liu

(10) Patent No.: US 8,063,608 B2
(45) Date of Patent: Nov. 22, 2011

(54) METHOD AND APPARATUS OF CHARGE MANAGEMENT FOR BATTERY IN MOBILE TERMINAL

(75) Inventor: Yonghua Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 799 days.

(21) Appl. No.: 12/215,506

(22) Filed: Jun. 27, 2008

(65) Prior Publication Data

US 2009/0085517 A1      Apr. 2, 2009

(30) Foreign Application Priority Data

Jun. 29, 2007   (CN) .......................... 2007 1 0118190

(51) Int. Cl.
*H01M 10/44*       (2006.01)
*H01M 10/46*       (2006.01)

(52) U.S. Cl. ....................................... 320/132

(58) Field of Classification Search .................. 320/107, 320/114, 132, 149; 324/426, 427, 430, 433
See application file for complete search history.

(56) References Cited

U.S. PATENT DOCUMENTS

| | | | | |
|---|---|---|---|---|
| 7,057,372 B2 * | 6/2006 | Chen et al. | ..................... | 320/106 |
| 7,233,127 B2 * | 6/2007 | Chen et al. | ..................... | 320/106 |
| 7,304,454 B2 | 12/2007 | Inui et al. | | |
| 2003/0169019 A1 * | 9/2003 | Oosaki | ......................... | 320/132 |
| 2003/0184307 A1 * | 10/2003 | Kozlowski et al. | ........... | 324/427 |
| 2005/0024015 A1 * | 2/2005 | Houldsworth et al. | ....... | 320/119 |
| 2005/0151513 A1 * | 7/2005 | Cook et al. | ..................... | 320/137 |
| 2006/0135217 A1 | 6/2006 | Sung et al. | | |

FOREIGN PATENT DOCUMENTS

JP       2005182626       7/2005

OTHER PUBLICATIONS

Japanese Patent Office Office Action in foreign counterpart Application No. JP2008-167242, dated Feb. 15, 2011.

\* cited by examiner

*Primary Examiner* — Edward Tso
(74) *Attorney, Agent, or Firm* — Kinney & Lange, P.A.

(57) ABSTRACT

The present invention provides a charge management method for a battery in a mobile terminal having the steps of: setting an initial charge start point; setting a statistic analysis interval for gathering the remaining capacity of the battery at time of start and creating a statistic array for recording the remaining capacity of the battery upon each power-on operation in the statistic analysis interval; reading current remaining capacity of the battery and storing it sequentially in the statistic array; calculating a new charge start point based on a predetermined adaptive algorithm; and updating the initial charge start point with the new charge start point. The present invention also provides a charge management apparatus for a battery in a mobile terminal. With the present invention, it is possible to set an optimal charge start point through measurements, and thus lengthen the battery's lifetime. Especially for users who rarely use a battery to supply power, the battery's lifetime can be considerably extended in a smart way, and the safety of use of battery is improved.

18 Claims, 8 Drawing Sheets

Statistic analysis inverval

A. Remaining capacity of battery at power-on with AC source present
B. Used amount
C. Maximal one-time used amount in statistic interval
D. Charge start point
E. Charge start point
F. Remaining capacityt
G. Maximal one-time used amoun
H. Charge start point

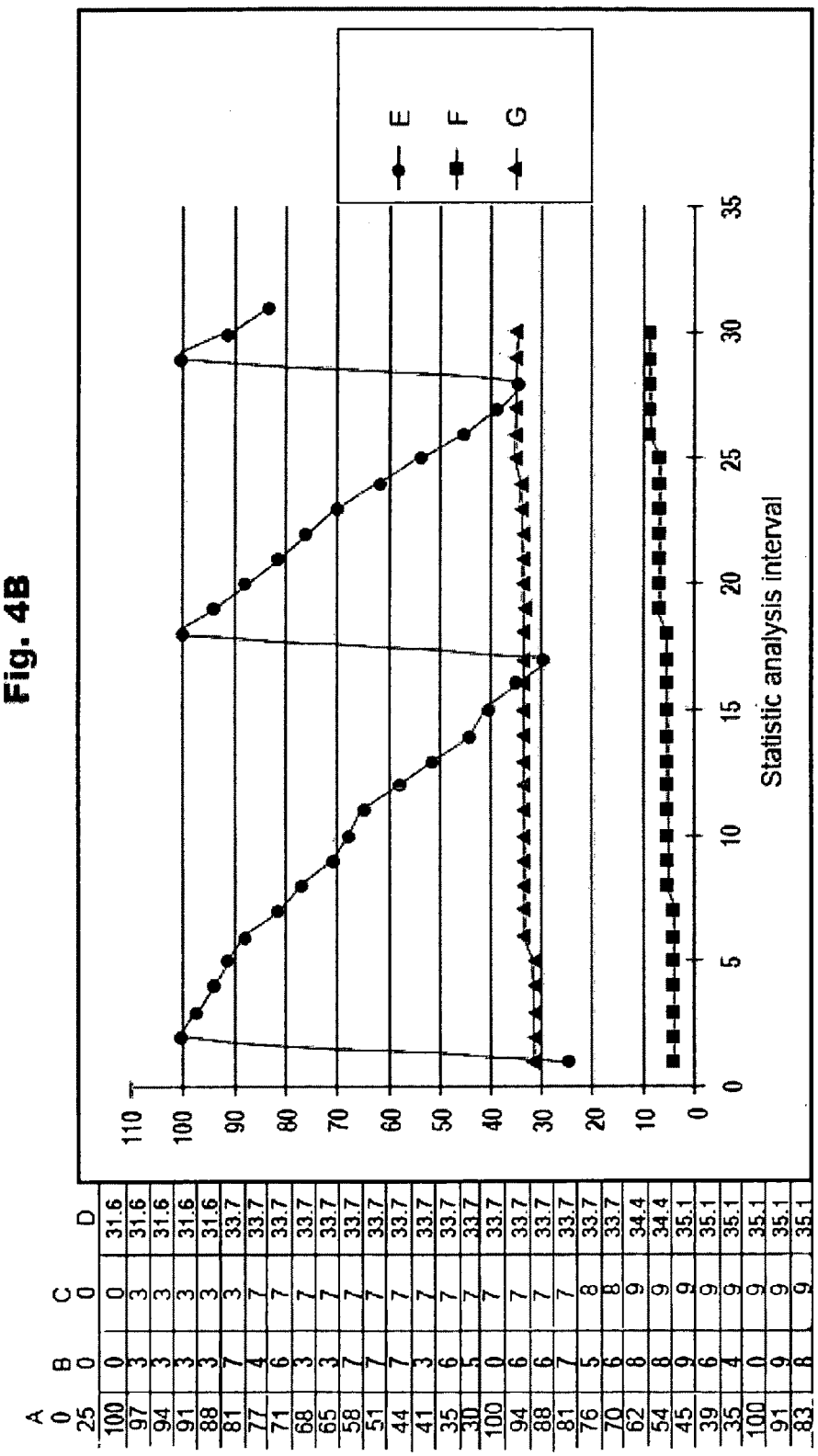

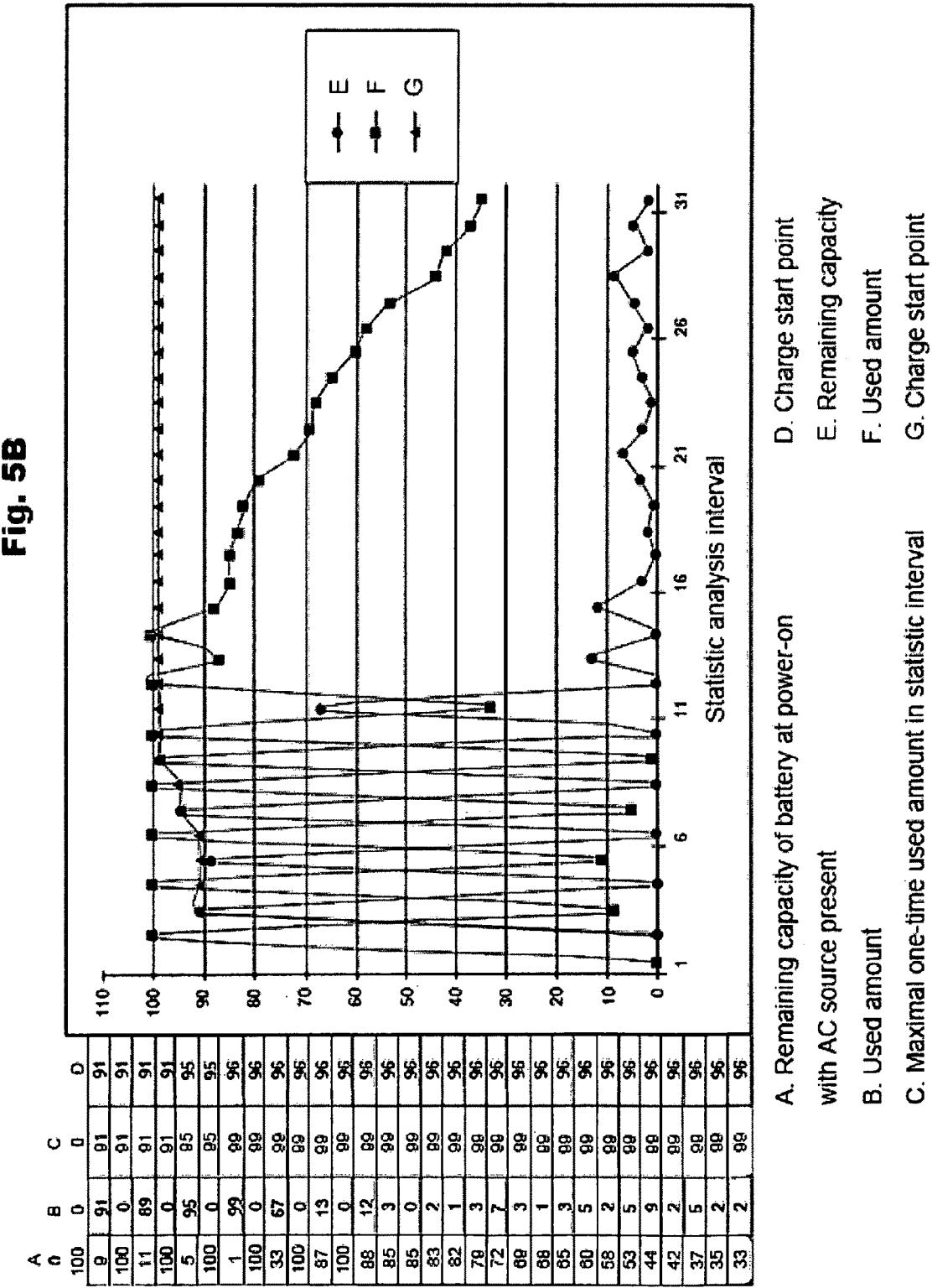

METHOD AND APPARATUS OF CHARGE MANAGEMENT FOR BATTERY IN MOBILE TERMINAL

BACKGROUND OF THE INVENTION

1. Field of Invention

The present invention relates to a battery in a mobile terminal (e.g., laptop computer, smart mobile phone) having a rechargeable battery, and more particularly, to a method and an apparatus of charge management for a battery in a mobile terminal.

2. Description of Prior Art

Power modes for a mobile terminal, such as laptop computer, are generally classified into two types, a battery-powered mode and an alternating-current (AC)-powered mode. The mobile terminal is powered by a rechargeable battery in the battery-powered mode, while it is powered by an AC source, to be specific, an external direct-current (DC) source provided by an AC/DC adapter, in the AC-powered mode. At this point, the rechargeable battery may be in a standby state or a charge state. Explanation will be given by example of a laptop computer.

Problems often occur during use of a battery in a laptop computer. More specifically, for a laptop computer used at home or office, the AC-powered mode is often adopted, whereas the battery-powered mode is scarcely used. The natural discharge or sporadic use (e.g., the computer is turned on before it is connected to the AC source) of the battery will result in continuous and cyclic charge of the battery and consequently an accelerated aging process of the battery. In most situations, users find that the battery's lifetime is short although it is rarely used. The lifetime usually lasts for only one or two years. In an extreme situation, aging of the battery may pose higher risk of explosion of the battery.

FIG. 1 shows a charge process of a lithium battery in a laptop computer, in which it is in a trickle charge mode when the battery capacity is between 96% and 100%. Currently, a common charge strategy for a laptop computer battery is to set a charge start point (e.g., to start the charge process when the remaining capacity of the battery is <96%, as shown in FIG. 2) and a charge stop point (e.g., 100%, that is, to stop the charge process when the remaining capacity of the battery reaches 100%) so that the charge process is executed cyclically from the capacity of 96% to 100%. This can ensure that the battery is always in a full charge status so as to meet the users' requirement of using the laptop computer in a mobile manner at any moment. However, for those who rarely adopt the battery-powered mode, such charge strategy will inevitably cause a repeated charge operation of the battery and accelerate its aging process. As a result, the users who often use laptop computers at home have to replace the batteries every one or two years, while they had had little use of the batteries.

So far, some technical solutions have been proposed to manage the charging of a battery. For example, a switch that can be manipulated manually (pressed or pushed) by a user is designed so that a SMC signal between a battery pack and an embedded controller (EC) on a motherboard of a laptop computer is shorted to ground. As such, to the EC, it seems that no battery pack is present (a better way is to cut off a battery presence signal BAT_PRES#). As a result, the stop of any charging process depends on users' decisions. Nevertheless it is infeasible to require ordinary and unprofessional computer users to decide when the charging should be stopped.

Moreover, in a patent application No. 200510136210.4 filed with SIPO of China on Dec. 20, 2005, for example, a mechanism is provided for charging a battery in a mobile electronic device. This mechanism determines a suitable time for charging process based on the habitual charging time or location (i.e., the location of the mobile device) of the user of the electronic mobile device. Then, it determines whether the charging process needs to be started according to the remaining capacity. It also raises an issue of when it is necessary to charge the battery in order to notify the user of such necessity. As can be seen, the mechanism is based on the user's habit, while most users cannot carry out the charging process in a correct way or a way in favor of battery lifetime. In fact, the habit of a user in charging a battery may not necessarily facilitate the maintenance of the battery or extension of the battery's lifetime. On the other hand, the implementation of such mechanism requires intervention from a user, which hinders a comfortable user experience.

It is desirable that a mobile terminal can automatically determine whether to charge its battery in favor of battery maintenance and enable different operations for different users, based on each user's usage and without any intervention from users.

SUMMARY OF THE INVENTION

The present invention is made in view of the above problems. An object of the present invention is to provide a charge management method for a battery in a mobile terminal, which can enable different operations for charge management based on users' usages of the battery, to overcome the above disadvantages in the relevant art.

According to an embodiment of the present invention, a charge management method for a battery in a mobile terminal is provided.

The method comprises steps of: setting an initial charge start point; setting a statistic analysis interval for gathering the remaining capacity of the battery at time of start and creating a statistic array for recording the remaining capacity of the battery upon each power-on operation in the statistic analysis interval; reading current remaining capacity of the battery and storing it sequentially in the statistic array; calculating a new charge start point with the statistic array based on a predetermined adaptive algorithm; and updating the initial charge start point with the new charge start point based on the calculation result.

Preferably, the current remaining capacity of the battery is read when an AC/DC adapter is connected to the mobile terminal and begins to supply power.

Preferably, the statistic analysis interval may be a predetermined number of power-on operations or a predetermined time period.

Here, elements in the statistic array are denoted by Asoc(1), Asoc(2), . . . , Asoc(N) and record sequentially the remaining capacities of the battery upon N power-on operations, wherein N is an integer equal to or greater than 1, and initial values of the elements are set to be 0.

In calculating the charge start point, a maximal power consumption amount of the mobile terminal after disconnected from the AC/DC adapter is first calculated according to the remaining capacities of the battery stored in the statistic array. The maximal power consumption amount, denoted by U, may be calculated through the following equation:

$$U=\text{Max }(\text{Asoc}(2)-\text{Asoc}(1), \ldots, \text{Asoc}(N)-\text{Asoc}(N-1)).$$

A first charge start point, denoted by S, may be calculated through the following equation as the new charge start point:

$$S=\text{Min }(\text{Max}(\text{Smin},U), \text{Smax}),$$

where Smin denotes a minimal charge start point, and Smax denotes a maximal charge start point. Further, Smin=5, and Smax=96.

A second charge start point, denoted by S2, may be calculated through the following equation as the new charge start point:

$$S2 = S+(Smax-S)*c, \text{ where } 0<c<1.$$

According to a further embodiment of the present invention, a charge management apparatus for a battery in a mobile terminal is provided.

The apparatus comprises an initial charge start point setting module for setting an initial charge start point; a statistic analysis interval setting module for setting a statistic analysis interval for gathering the remaining capacity of the battery at time of start; a statistic array creating module for creating a statistic array for recording the remaining capacity of the battery upon each power-on operation in the statistic analysis interval; a reading module for reading current remaining capacity of the battery and storing it sequentially in the statistic array; a calculation module for calculating a new charge start point based on a predetermined adaptive algorithm; and an updating module for updating the initial charge start point with the new charge start point calculated by the calculation module.

Preferably, the reading module reads the current remaining capacity of the battery when an AC/DC adapter is connected to the mobile terminal and begins to supply power.

Further, the statistic analysis interval may be a predetermined number of power-on operations or a predetermined time period. Here, elements in the statistic array are denoted by Asoc(1), Asoc(2), ..., Asoc(N) and record sequentially the remaining capacities of the battery upon N power-on operations, wherein N is an integer equal to or greater than 1, and the initial values of the elements are set to be 0.

The calculation module calculates a maximal power consumption amount of the mobile terminal after disconnected from the AC/DC adapter according to the remaining capacities of the battery stored in the statistic array.

The calculation module calculates the maximal power consumption amount denoted by U through the following equation:

$$U=\text{Max} (Asoc(2)-Asoc(1), \ldots, Asoc(N)-Asoc(N-1)).$$

The calculation module calculates a first charge start point denoted by S through the following equation as the new charge start point:

$$S=\text{Min} (\text{Max}(Smin,U), Smax),$$

where Smin denotes a minimal charge start point, and Smax denotes a maximal charge start point. Further, Smin=5, and Smax=96.

Further, the calculation module may calculate a second charge start point denoted by S2 through the following equation as the new charge start point:

$$S2=S+(Smax-S)*c, \text{ where } 0<c<1.$$

With the solutions of the present invention, it is possible to set an optimal charge start point through measurements, reduce the frequency of battery charge operations, and thus lengthen the battery's lifetime. Especially for users who rarely use a battery to supply power, the battery's lifetime can be considerably extended. Safety in use of rechargeable batteries is improved.

BRIEF DESCRIPTION OF THE DRAWINGS

The figures given here are intended to facilitate an understanding of the present invention and constitute a part of the application. The exemplary embodiments and description thereof for the present invention are intended to explain the present invention rather than limit the present invention. In the figures:

FIGS. 4A and 4B are graphs obtained when the charge management method according to the embodiment of the present invention is applied to a laptop computer which is scarcely powered by the battery;

FIGS. 5A and 5B are graphs obtained when the charge management method according to the embodiment of the present invention is applied to a laptop computer which is often powered by the battery.

DETAILED DESCRIPTION OF PREFERRED EMBODIMENTS

Now, the embodiments of the present invention will be elaborated with reference to the figures.

Embodiment for Method

A charge management method for a battery in a mobile terminal is provided in the embodiment.

Figure 1:
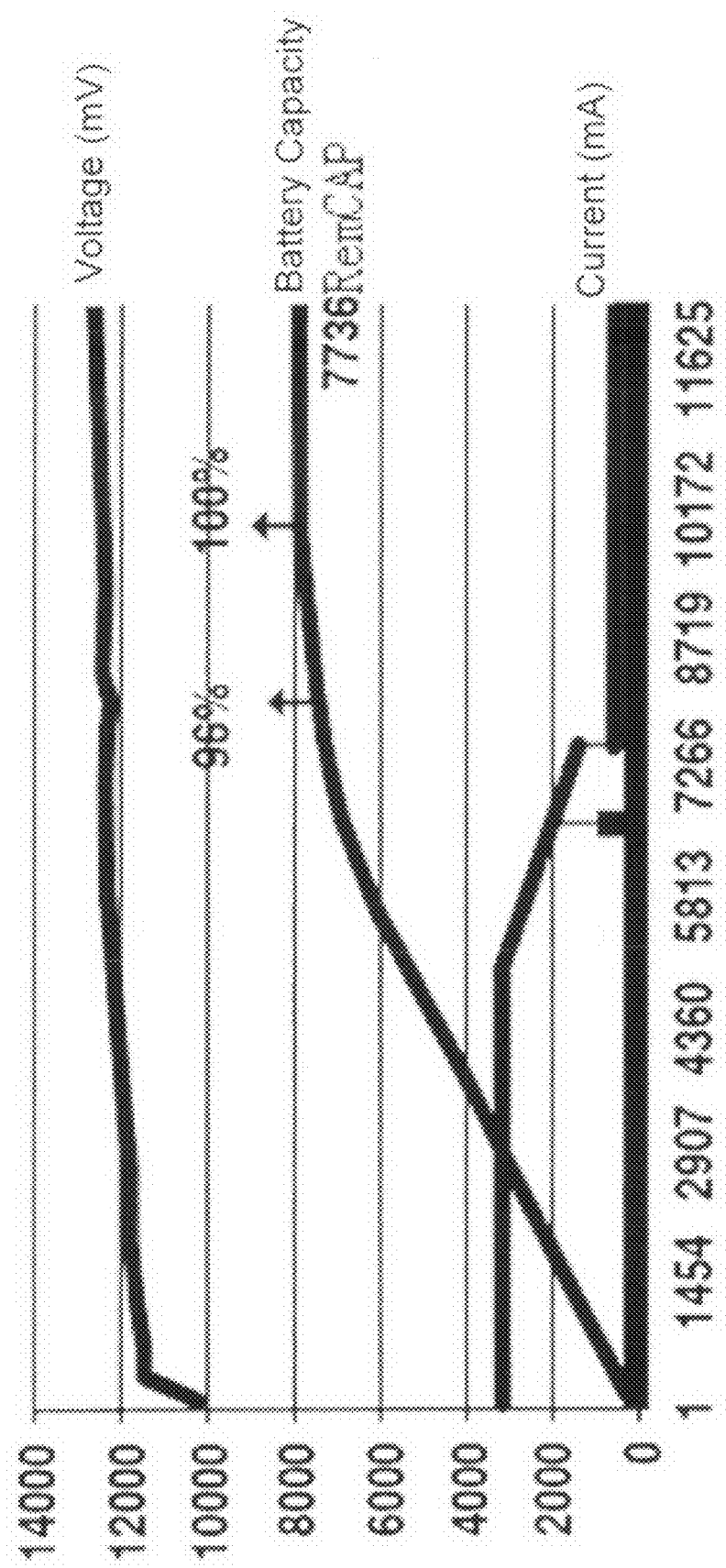
FIG. 1 is a graph of power capacity during a charging process of a laptop computer battery according to the prior art.
Figure 2:
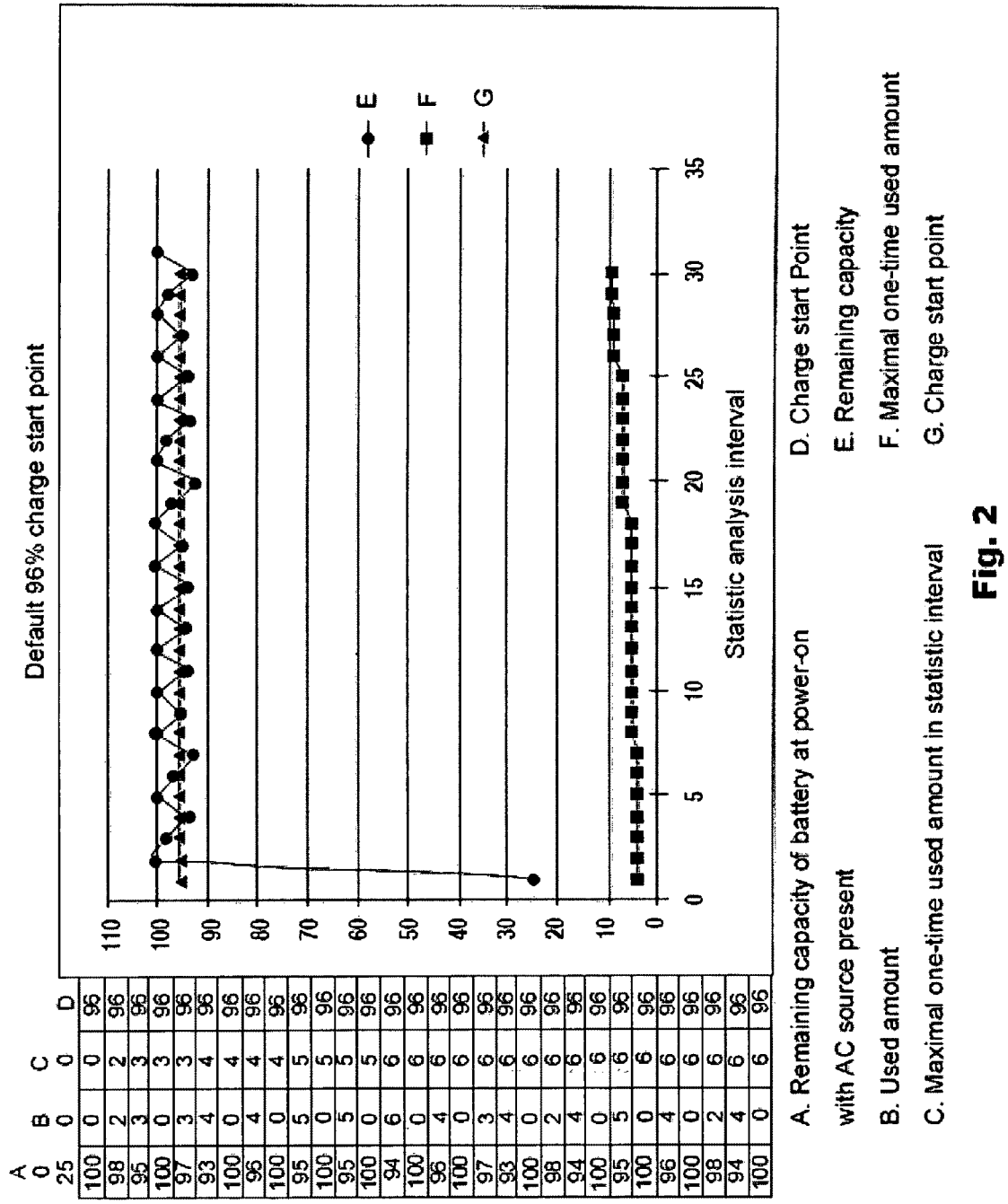
FIG. 2 is a graph of power capacity when employing a fixed charge start point of 96% and a fixed charge stop point of 100% according to the prior art.
Figure 3:
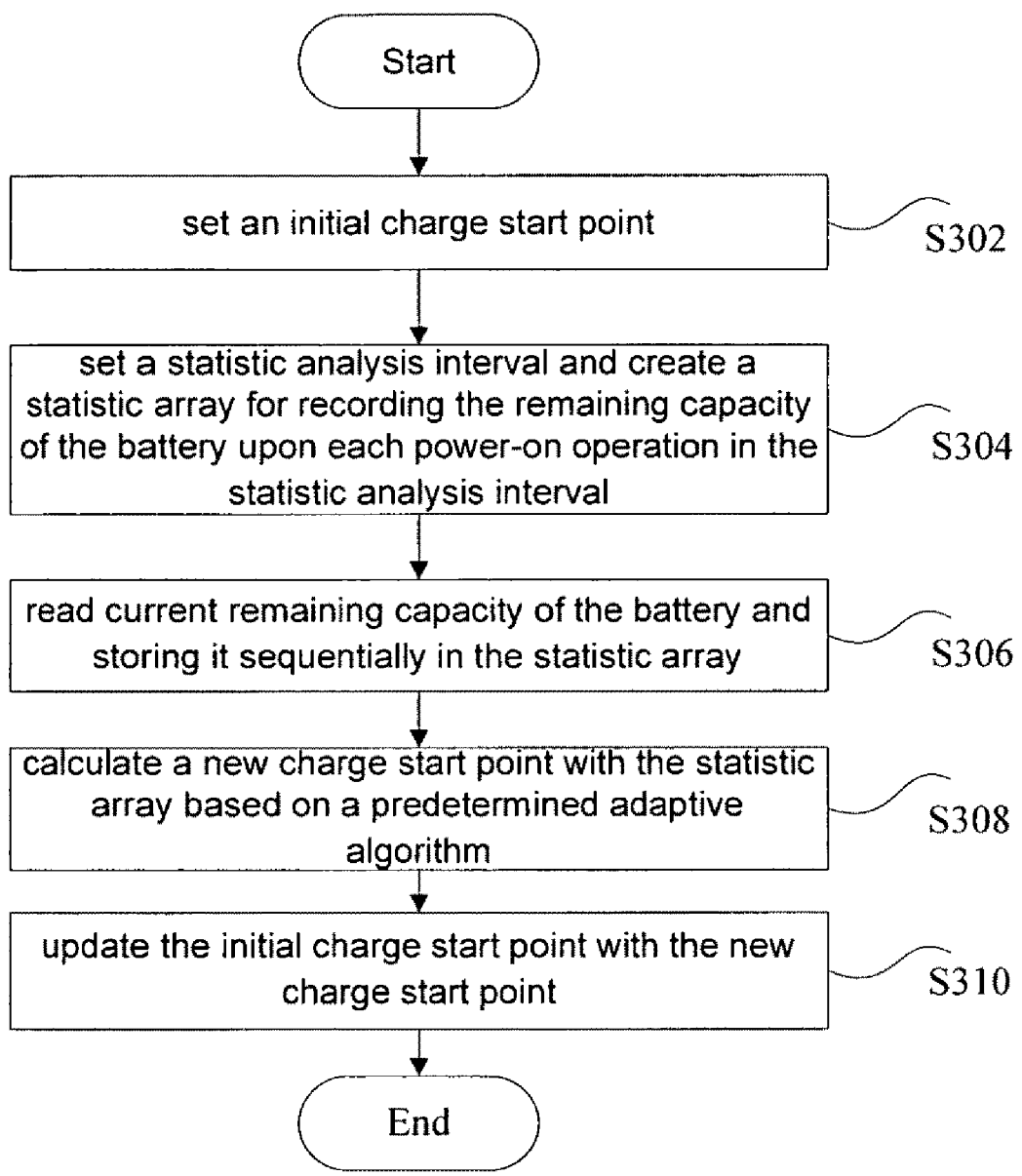
FIG. 3 is a flowchart of a charge management method for a battery in a mobile terminal according to an embodiment of the present invention.

As shown in FIG. 3, according to the embodiment of the present invention, the charge management method for a battery in a mobile terminal comprises the following steps:

Step S302: setting an initial charge start point;

Step S304: setting a statistic analysis interval for gathering the remaining capacity of the battery (preferably, the percentage of the remaining capacity can be read) at time of start and creating a statistic array for recording the remaining capacity of the battery upon each power-on operation in the statistic analysis interval;

Step S306: reading current remaining capacity of the battery and storing it sequentially in the statistic array;

Step S308: calculating a new charge start point based on a predetermined adaptive algorithm; and Step S310: updating the initial charge start point with the new charge start point.

In the above method, the battery capacity will not be read if no AC/DC adapter serves to supply power. The time for reading the remaining capacity of the battery should be set to be the moment when an AC/DC adapter is connected and begins to supply power. Such time is usually found by an embedded controller (EC) on a motherboard of a laptop computer. Also, a corresponding register reflects a status indicating whether a power AC/DC adapter is present.

The statistic analysis interval (i.e., time for data acquisition) may be a predetermined number of power-on operations or a predetermined time period. In order to adapt the statistic algorithm to recent usage habit of a user, the used data of the array are the latest N pieces of data. As to how many pieces of data can be used, it can depend on the user's choice and definition. With fewer pieces of data, the more closely is the recent usage habit of the user conformed to. This is suitable for users with relatively great variation in recent usage habit.

With more pieces of data, the more closely is the long-term usage habit of the user conformed to. This is suitable for users having relatively fixed usage habit.

Specifically, the statistic interval may be an interval of N power-on operations, N days (e.g., 90 days) or N months. In addition, elements in the statistic array are denoted by Asoc(1), Asoc(2), . . . , Asoc(N) and record sequentially the remaining capacities of the battery upon the N power-on operations, wherein N is an integer equal to or greater than 1. The initial values of the elements are set to be 0. The percentage of the remaining capacity of the battery pack usually ranges from 0 to 100% (probably exceeding 100%).

It is noted that Asoc used here is the percentage of remaining capacity of the battery. Reference may be made to a parameter AbsoluteStateofCharge( ) for a smart battery.

In fact, the maximal length of the statistic array may be Nmax (N<=Nmax). The recorded values of Asoc upon each power-on operation are denoted as Asoc(1), Asoc(2), . . . , Asoc(Nmax). These recorded data are arranged, in a temporal order from past to present, as Asoc(Nmax), . . . , Asoc(N), Asoc(N−1), . . . , Asoc(2), Asoc(1). Here, the initial values for all the data are set to be 0. In real calculation, however, it is preferable to deduce the optimal charge start point from the recent N pieces of data, Asoc(N), Asoc(N−1), . . . , Asoc(2), Asoc(1).

In calculating the charge start point, a maximal power consumption amount of the mobile terminal after disconnected from the AC/DC adapter is first calculated according to the remaining capacities of the battery stored in the statistic array. The maximal power consumption amount, denoted by U, may be calculated through the following equation:

$$U=\text{Max} (Asoc(2)-Asoc(1), \ldots, Asoc(N)-Asoc(N-1)).$$

It is noted that, since the charge process from 0 to full capacity of an ordinary laptop computer battery generally takes a time period shorter than the use (discharge) time period of the laptop computer, the selection of a value not less than U for calculating the charge start point S (the optimal charge start point) can ensure there is electric power not less than U in amount left every time the computer is disconnected from the AC/DC adapter.

Then, based on the calculated value of U, preferably, a first charge start point, denoted by S, may be calculated through the following equation as the new charge start point:

$$S=\text{Min} (\text{Max}(Smin,U), Smax),$$

where Smin denotes a minimal charge start point, and Smax denotes a maximal charge start point. As required by battery properties or usage demands, the charge start point is usually subject to the requirement of minimal value and maximal value (the reason is that an excessively high charge start point will cause a trickle charge process). For example, it is preferable that Smin=5 and Smax=96 for a Li-Ion battery.

Further, a second charge start point, denoted by S2, may be calculated through the following equation as the new charge start point. Here, S2 is a more conservative charge start point.

$$S2=S+(Smax-S)*c, \text{ where } 0<c<1.$$

Preferably, the value of c may be selected to be 30%. The greater is the value of c, the more the margin on the basis of the user's habit is given. That is, the likelihood of occurrence of insufficient battery capacity during the usage after the AC/DC adapter is removed is lowered.

Figure 4A:
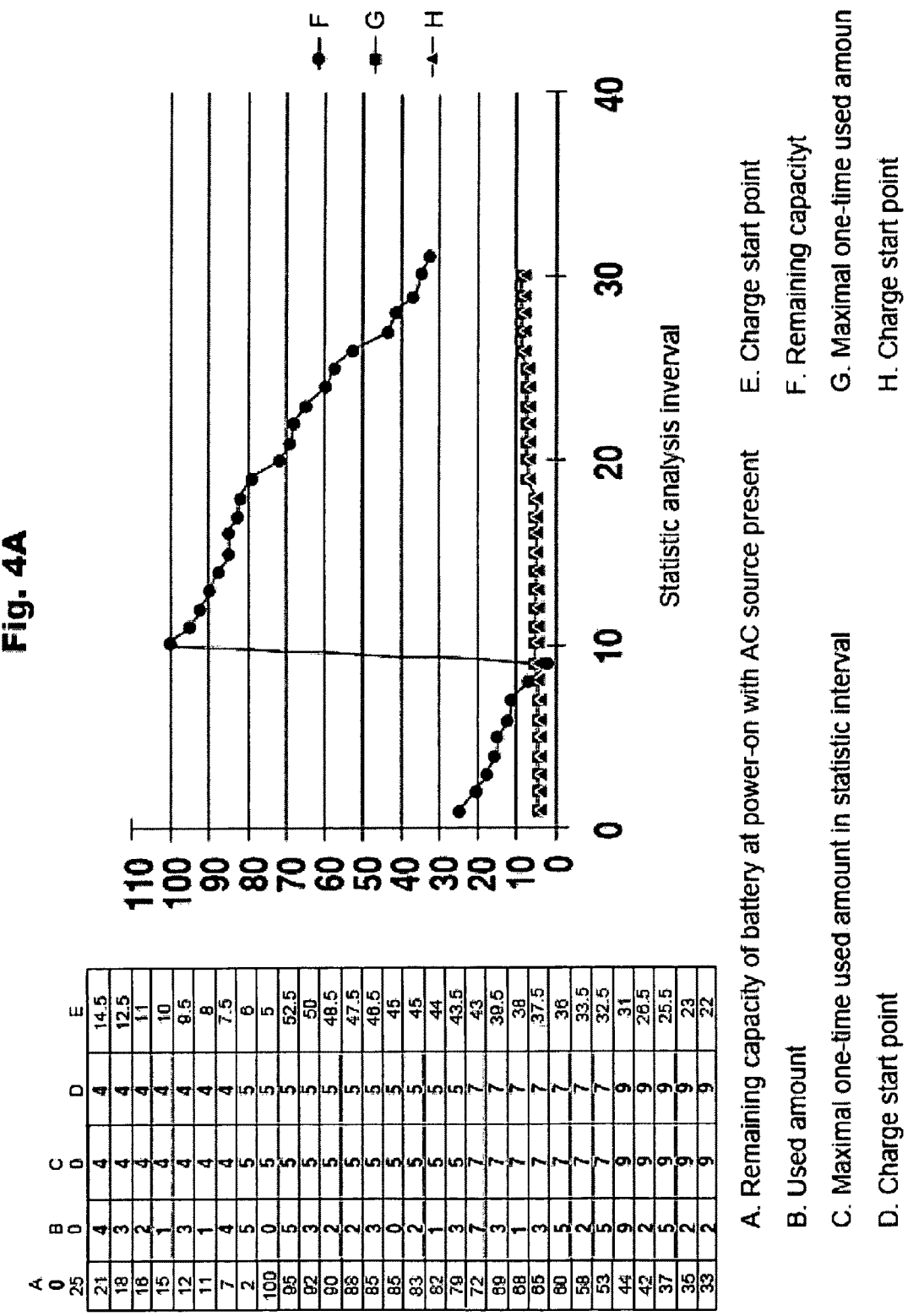

FIGS. 4A and 4B are graphs obtained when the charge management method according to the embodiment of the present invention is applied to a laptop computer which is scarcely powered by the battery. The first charge start point S calculated above is used in FIG. 4A. Here, the battery of the laptop computer is only charged every one or two months (that is, AC power supply is often used). The battery pack needs not to be replaced during the entire lifetime of the laptop computer (for a Li-Ion battery, the number of charge and discharge operations may be up to 500). Even when the power mode is changed abruptly (no AC power supply), there is a probability of 50% that half of battery capacity still remains. The charge start point S2 of the present invention is used in FIG. 4B. As shown in this figure, the utilization rate of the battery is a little higher than that of FIG. 4A, and the charge start point is higher than that of FIG. 4A. Even when the power mode is changed abruptly (no AC power supply), there is probability of 50% that 66% of the battery capacity still remains. FIGS. 4A and 4B shows the cases in which the interval between two successive charge operations of the battery is long. As such, the battery can be effectively protected.

Figure 5A:
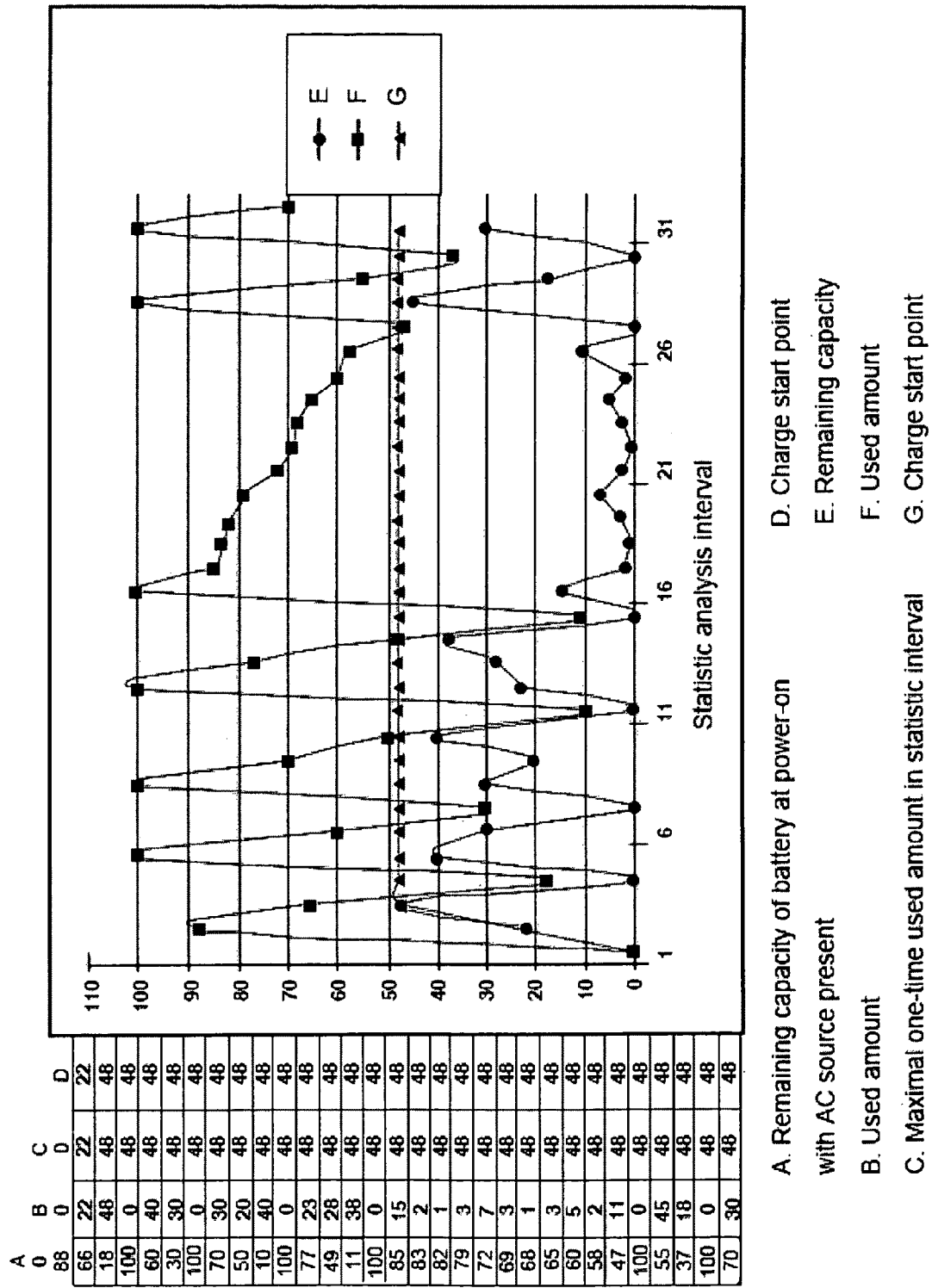

FIGS. 5A and 5B are graphs obtained when the charge management method according to the embodiment of the present invention is applied to a laptop computer which is often powered by the battery. As shown in FIG. 5A, the number of charge operations decreases from 20-30 to 5 for the battery in the laptop computer. That is, the number of charge operations decreases greatly, and safety is improved. FIG. 5B shows the power capacity in the battery is often zero. In other words, FIG. 5B shows a case of frequent usage of the battery. As can be seen in this figure, the charge start point is set at a very high level (close to 100%). Thus, it can be guaranteed that the charge operation is started as soon as the laptop computer is connected to an AC power supply, in preparation for use.

As shown in FIGS. 4A and 4B and FIGS. 5A and 5B, each of the gathered remaining capacities of the battery corresponds to one charge start point. The calculation of a charge start point must be performed after each gathering, since information on the user's habit is updated every time new statistic data is gathered, and the charge start point should be updated accordingly.

Embodiment for Apparatus

In this embodiment, a charge management apparatus 600 for a battery in a mobile terminal is provided.

Figure 6:
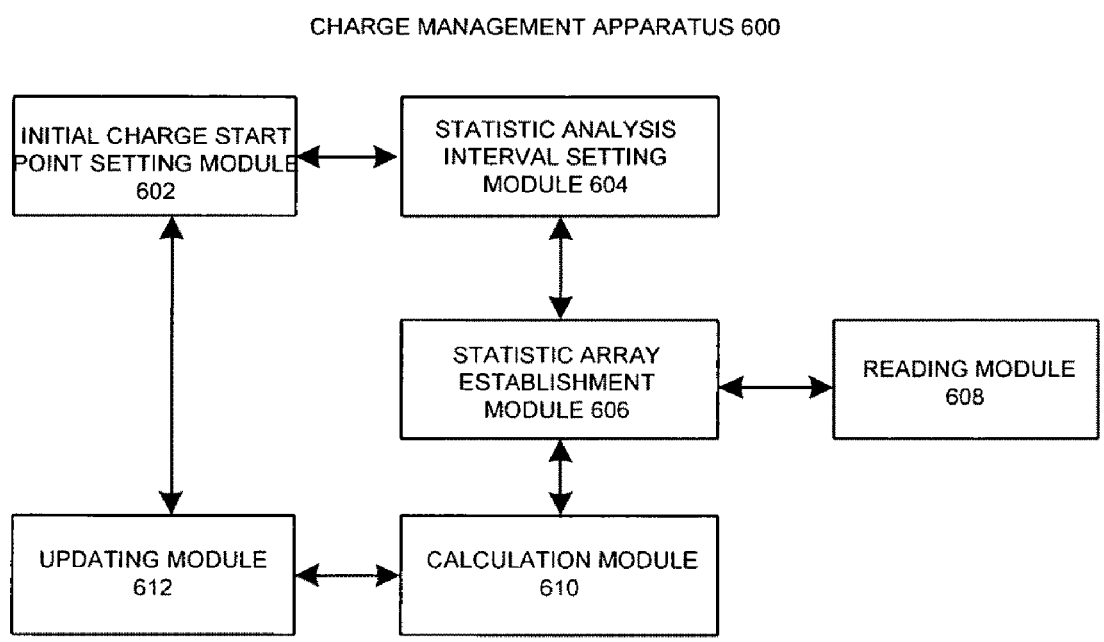
FIG. 6 is a block diagram of a charge management apparatus according to an embodiment of the present invention.

As shown in FIG. 6, the charge management apparatus 600 according to the embodiment comprises an initial charge start point setting module 602 for setting an initial charge start point, a statistic analysis interval setting module 604 for setting a statistic analysis interval for gathering the remaining capacity of the battery at time of start, a statistic array creating module 606 for creating a statistic array for recording the remaining capacity of the battery upon each power-on operation in the statistic analysis interval, a reading module 608 for reading current remaining capacity of the battery (preferably, the percentage of the remaining capacity may be read) and storing it sequentially in the statistic array, a calculation module 610 for calculating a new charge start point based on a predetermined adaptive algorithm, and an updating module 612 for updating the initial charge start point with the new charge start point calculated by the calculation module 610.

In the apparatus, the reading module 606 reads the current remaining capacity of the battery when an AC/DC adapter is connected to the mobile terminal and begins to supply power. In other words, the current remaining capacity of the battery is read every time the power mode is switched from the battery-powered mode to the AC power mode.

Further, the statistic analysis interval may be a predetermined number of power-on operations or a predetermined time period. Here, elements in the statistic array are denoted by Asoc(1), Asoc(2), . . . , Asoc(N) and record sequentially the remaining capacities of the battery upon the N power-on operations, wherein N is an integer equal to or greater than 1. The initial values of the elements are set to be 0.

The calculation module 610 calculates a maximal power consumption amount of the mobile terminal after disconnected from the AC/DC adapter according to the remaining capacities of the battery stored in the statistic array.

The calculation module 610 calculates the maximal power consumption amount denoted by U through the following equation:

$$U=\text{Max}(A\text{soc}(2)-A\text{soc}(1), \ldots, A\text{soc}(N)-A\text{soc}(N-1)).$$

The calculation module 610 calculates a first charge start point denoted by S through the following equation as the new charge start point:

$$S=\text{Min}(\text{Max}(S\text{min},U), S\text{max}),$$

where Smin denotes a minimal charge start point, and Smax denotes a maximal charge start point. For example, it is preferable that Smin=5 and Smax=96 for a Li-Ion battery.

Further, a second charge start point, denoted by S2, is calculated through the following equation as the new charge start point. Here, S2 is a more conservative charge start point.

$$S2=S+(S\text{max}-S)*c, \text{ where } 0<c<1.$$

Preferably, the value of c may be selected to be 30%.

The effects shown in FIGS. 4A and 4B and FIGS. 5A and 5B may also be obtained when the charge management apparatus 600 according to the embodiment is applied to a laptop computer. Moreover, the various specific details illustrated for the method embodiment may also be applied to the apparatus embodiment, and thus the description thereof is omitted.

In summary, with the solutions of the present invention, the laptop computer is enabled to gather and analyze the manner in which the user utilizes the battery (e.g., such function may be implemented through internal programs of a smart battery, motherboard EC programs, BIOS programs or applications under an operating system), set an optimal charge start point through measurements and thus improve the battery's lifetime. Especially for users who rarely use a battery to supply power, the battery's lifetime can be considerably extended in a smart way. The safety for use of battery is also improved.

The foregoing description illustrates merely the preferred embodiments of the present invention and has no intention of limiting the scope of the present invention.

For those skilled in the art, various modifications and variations may be made to the present invention. Any change, substitution or improvement within the spirit and principle of the present invention should fall into the scope of the present invention.

What is claimed is:

1. A charge management method carried out by a processor of a mobile terminal for a battery in the mobile terminal, comprising steps of:
    setting an initial charge start point;
    setting a statistic analysis interval for gathering a remaining capacity of the battery at time of start and creating a statistic array for recording the remaining capacity of the battery upon each power-on operation in said statistic analysis interval;
    reading current remaining capacity of the battery and storing it sequentially in said statistic array;
    calculating a new charge start point with said statistic array based on a predetermined adaptive algorithm; and
    updating said initial charge start point with said new charge start point.

2. The charge management method of claim 1, wherein said current remaining capacity of the battery is read when an AC/DC adapter is connected to said mobile terminal and begins to supply power.

3. The charge management method of claim 2, wherein said statistic analysis interval is a predetermined number of power-on operations or a predetermined time period.

4. The charge management method of claim 3, wherein elements in said statistic array are denoted by Asoc(1), Asoc(2), . . . , Asoc(N) and record sequentially the remaining capacities of the battery upon N power-on operations, wherein N is an integer equal to or greater than 1, and initial values of said elements are set to be 0.

5. The charge management method of claim 4, wherein in calculating the charge start point, a maximal power consumption amount of said mobile terminal after disconnected from said AC/DC adapter is first calculated according to said remaining capacities of the battery stored in said statistic array.

6. The charge management method of claim 5, wherein said maximal power consumption amount, denoted by U, is calculated through the following equation:

$$U=\text{Max}(A\text{soc}(2)-A\text{soc}(1), \ldots, A\text{soc}(N)-A\text{soc}(N-1)).$$

7. The charge management method of claim 6, wherein a first charge start point, denoted by S, is calculated through the following equation as said new charge start point:

$$S=\text{Min}(\text{Max}(S\text{min},U), S\text{max}),$$

where Smin denotes a minimal charge start point, and Smax denotes a maximal charge start point.

8. The charge management method of claim 7, wherein Smin=5 and Smax=96.

9. The charge management method of claim 7, wherein a second charge start point, denoted by S2, is calculated through the following equation as said new charge start point:

$$S2=S+(S\text{max}-S)*c, \text{ where } 0<c<1.$$

10. A charge management apparatus for a battery in a mobile terminal, comprising:
    an initial charge start point setting module for setting an initial charge start point;
    a statistic analysis interval setting module for setting a statistic analysis interval for gathering a remaining capacity of the battery at time of start;
    a statistic array creating module for creating a statistic array for recording the remaining capacity of the battery upon each power-on operation in said statistic analysis interval;
    a reading module for reading current remaining capacity of the battery and storing it sequentially in said statistic array;
    a calculation module for calculating a new charge start point with said statistic array based on a predetermined adaptive algorithm; and
    an updating module for updating said initial charge start point with said new charge start point calculated by said calculation module.

11. The charge management apparatus of claim 10, wherein said reading module reads the current remaining capacity of the battery when an AC/DC adapter is connected to said mobile terminal and begins to supply power.

12. The charge management apparatus of claim 11, wherein said statistic analysis interval is a predetermined number of power-on operations or a predetermined time period.

13. The charge management apparatus of claim 12, wherein elements in said statistic array are denoted by Asoc(1), Asoc(2), . . . , Asoc(N) and record sequentially the remaining capacities of the battery upon N power-on operations, wherein N is an integer equal to or greater than 1, and initial values of said elements are set to be 0.

14. The charge management apparatus of claim 13, wherein said calculation module calculates a maximal power consumption amount of said mobile terminal after disconnected from said AC/DC adapter according to said remaining capacities of the battery stored in said statistic array.

15. The charge management apparatus of claim 14, wherein said calculation module calculates said maximal power consumption amount denoted by U through the following equation:

$$U = \mathrm{Max}(\mathrm{Asoc}(2) - \mathrm{Asoc}(1), \ldots, \mathrm{Asoc}(N) - \mathrm{Asoc}(N-1)).$$

16. The charge management apparatus of claim 15, wherein said calculation module calculates a first charge start point denoted by S through the following equation as said new charge start point:

$$S = \mathrm{Min}(\mathrm{Max}(\mathrm{Smin}, U), \mathrm{Smax}),$$

where Smin denotes a minimal charge start point, and Smax denotes a maximal charge start point.

17. The charge management apparatus of claim 16, wherein Smin=5 and Smax=96.

18. The charge management apparatus of claim 16, wherein said calculation module calculates a second charge start point denoted by S2 through the following equation as said new charge start point:

$$S2 = S + (\mathrm{Smax} - S)*c, \text{ where } 0 < c < 1.$$

* * * * *